(12) United States Patent
Ullman et al.

(10) Patent No.: US 9,126,697 B2
(45) Date of Patent: Sep. 8, 2015

(54) ATMOSPHERIC TURBULENCE ISOLATION SYSTEM AND METHOD

(75) Inventors: Alan Z. Ullman, Northridge, CA (US); Steven F. Griffin, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 1341 days.

(21) Appl. No.: 12/240,754

(22) Filed: Sep. 29, 2008

(65) Prior Publication Data

US 2010/0078863 A1    Apr. 1, 2010

(51) Int. Cl.
*B64D 47/08*    (2006.01)
*B64C 1/40*    (2006.01)
*F16F 9/30*    (2006.01)

(52) U.S. Cl.
CPC . *B64D 47/08* (2013.01); *B64C 1/40* (2013.01); *F16F 9/306* (2013.01)

(58) Field of Classification Search
CPC ............ B64D 47/08; F16F 9/306; B64C 1/40
USPC .................... 244/1 N, 54, 119, 132
See application file for complete search history.

(56) References Cited

U.S. PATENT DOCUMENTS

| | | | | |
|---|---|---|---|---|
| 3,976,269 | A | * | 8/1976 | Gupta ........................... 244/119 |
| 4,828,202 | A | * | 5/1989 | Jacobs et al. .................. 244/119 |
| 5,742,384 | A | * | 4/1998 | Farmer ....................... 356/141.4 |
| 6,098,926 | A | * | 8/2000 | Morgenthaler ............... 244/119 |
| 7,440,190 | B2 | | 10/2008 | Ullman |
| 2002/0084381 | A1 | * | 7/2002 | Lemire et al. .................... 244/54 |
| 2009/0052478 | A1 | | 2/2009 | Vassberg et al. |
| 2011/0001007 | A1 | * | 1/2011 | Fox et al. ....................... 244/119 |

* cited by examiner

*Primary Examiner* — Valentina Xavier

(57) ABSTRACT

A vibration isolation assembly for an aerodynamic object comprises a viscoelastic inner layer disposed on the aerodynamic object and being configured to attenuate vibration. The vibration isolation assembly further comprises a rigid or stiff outer layer disposed on an inner layer. The vibration isolation assembly may attenuate the transmission of aerodynamically-induced vibration to components contained or mounted to the aerodynamic object.

12 Claims, 4 Drawing Sheets

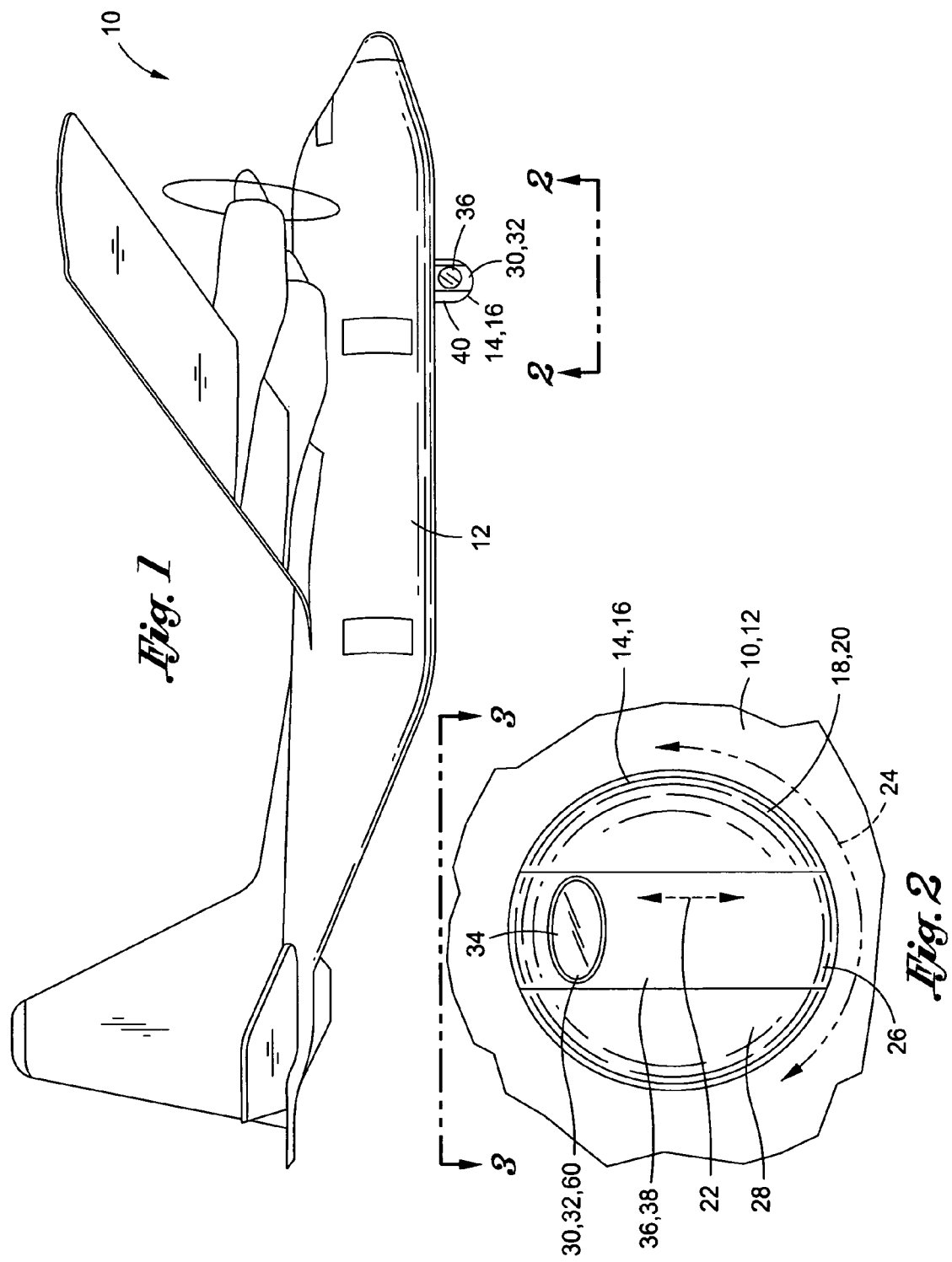

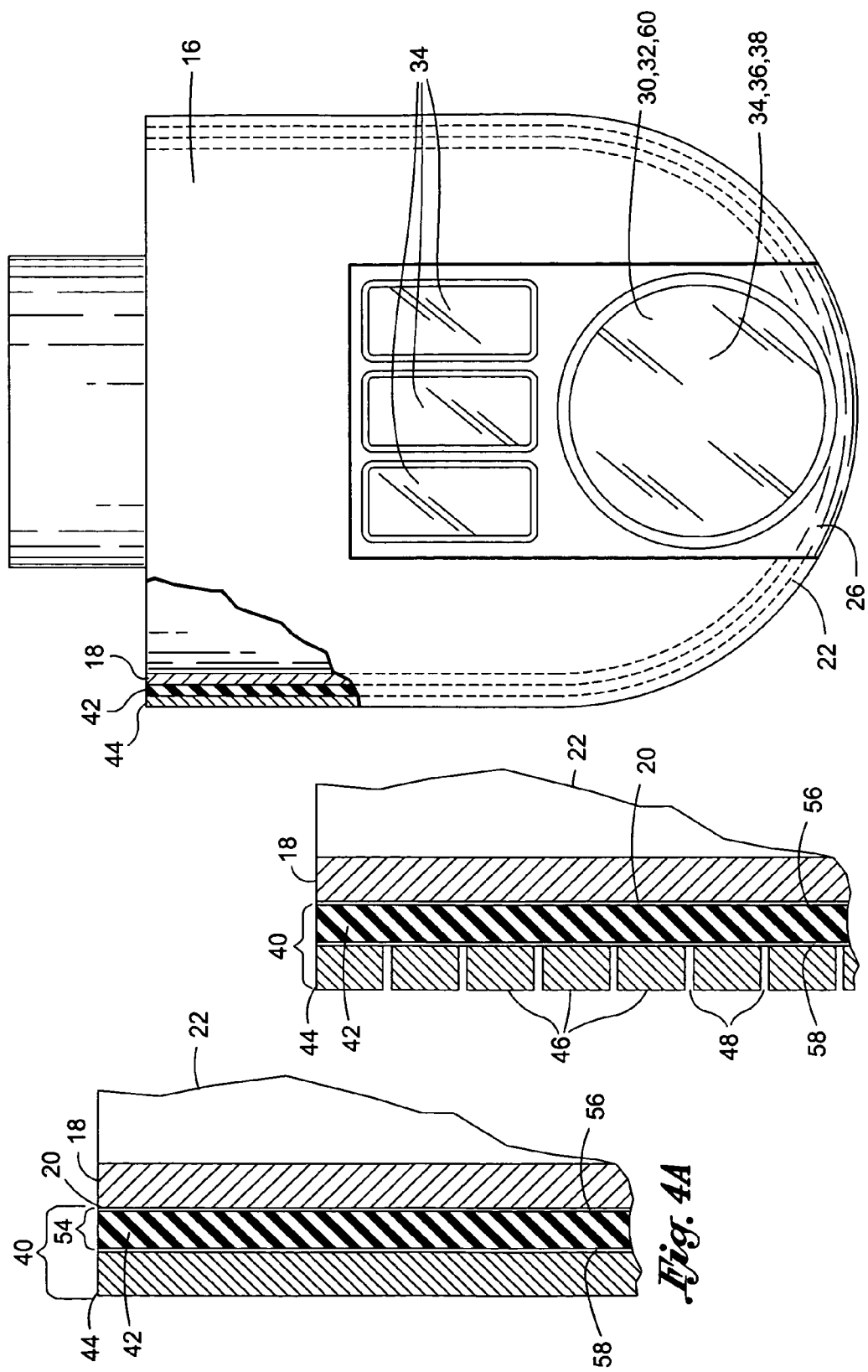

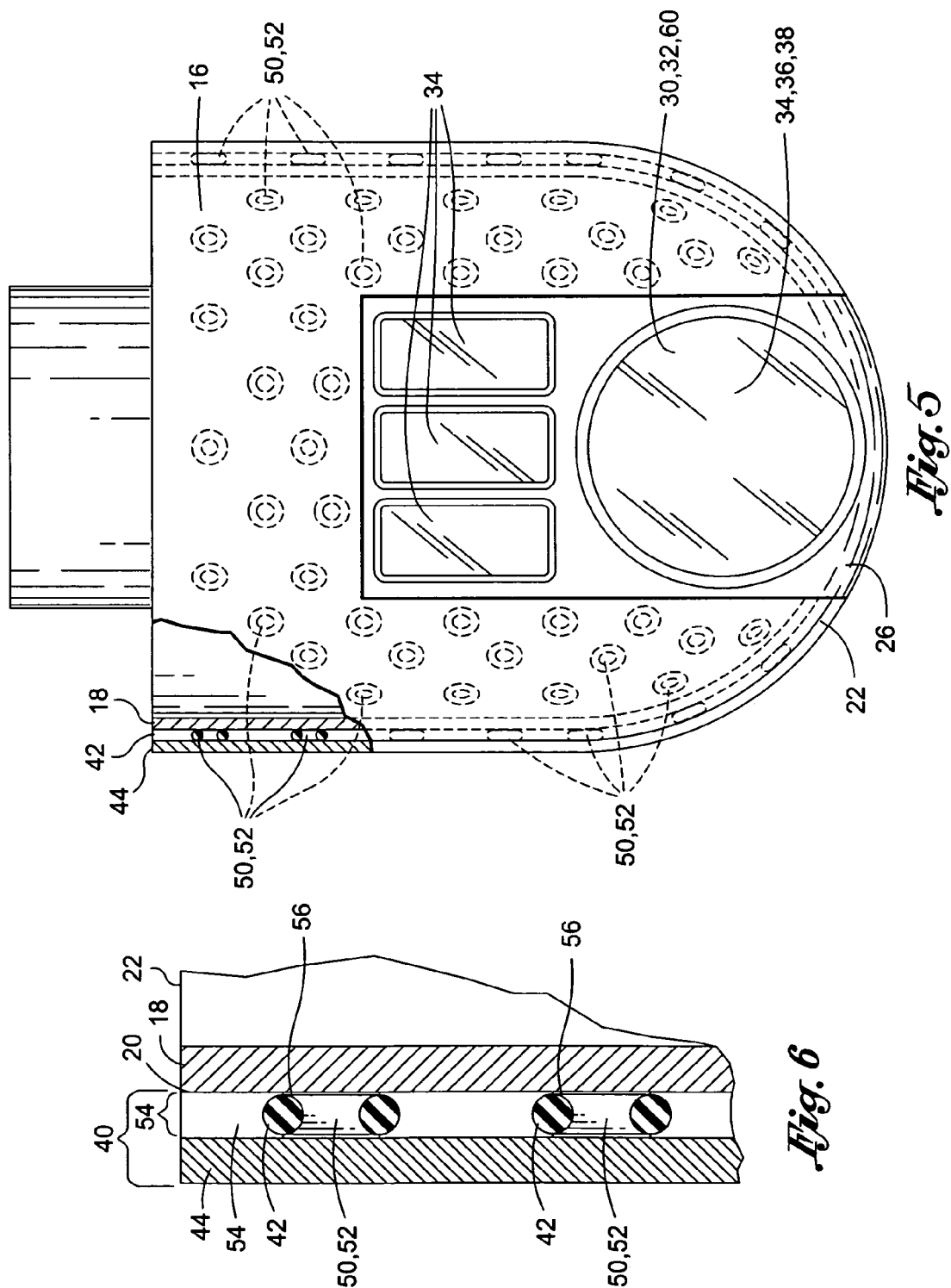

ATMOSPHERIC TURBULENCE ISOLATION SYSTEM AND METHOD

STATEMENT RE: FEDERALLY SPONSORED RESEARCH/DEVELOPMENT

This invention was made with Government support under Contract No. F29601-03-C-0146 awarded by the Air Force. The government has certain rights in this invention.

CROSS-REFERENCE TO RELATED APPLICATIONS (Not Applicable)

FIELD

The present invention relates generally to vibration isolation and, more particularly, to a vibration isolation assembly specifically adapted to reduce aerodynamic pressure fluctuations which induce vibration in an aerodynamic object.

BACKGROUND

For systems containing sensitive instrumentation, it is typically desirable to minimize vibration such that the instrumentation may perform at an optimal level while avoiding damage to the instrumentation. For example, in tactical weapons such as airborne lasers mounted on aircraft, a beam director is typically included for controlling the direction along which a laser beam is projected to a target. The beam director may include a turret assembly to allow for directional control of the laser beam within a universal range of motion.

In order to maximize the effectiveness of the laser beam, it is desirable to control the direction along which the laser beam is projected with a high degree of precision. As part of its directional control system, the beam director may include sensitive optical systems and electronic components mounted within the turret assembly and which may facilitate target acquisition and directional control of the projected laser beam. In order to maximize the precision with which the beam is projected onto the target, it is typically desirable to minimize vibration of the turret assembly.

Although the turret assembly may be mounted at any location on the aircraft, tactical lasers may be mounted at locations subject to air turbulence. For example, certain tactical lasers may be mounted on an underside of a fuselage of the aircraft. Such mounting is distinct to other mounting locations wherein the beam director may be housed within a turret positioned on the nose of the aircraft. Although mounting on the underside of the fuselage provides certain operational advantages, such location exposes the turret assembly to undesirable aerodynamic effects. For example, significant aerodynamic turbulence may be present in the fuselage area where the turret assembly is mounted due to interactions between the air flow and the turret assembly and aircraft. Such aerodynamic turbulence is manifested as pressure fluctuations that may be non-uniformly and/or non-synchronously imposed on the turret assembly. Additionally, the turret assembly may produce additional aerodynamic turbulence and pressure fluctuations due to flow separation aft of the turret assembly as well as due to specific configuration features of the turret assembly that create local flow separation.

Unfortunately, such non-uniform loading on the turret assembly induces vibration which is transmitted to sensitive electronics and optics contained within the turret assembly. Such vibrations affect the performance of the optics and electronics and thereby affects the precision with which the laser may be projected to a target. In this regard, vibrations induced by aerodynamic loading on an outer surface of the turret assembly and which are transmitted to the beam director result in jittering of the laser beam which, when projected onto a target, minimizes the energy density with which the laser may be applied to the target.

Prior art attempts to reduce aerodynamically-induced vibration have taken several approaches. In one approach known as the turret-in-turret approach, an outer turret is mounted to the aircraft. An inner turret is mounted to the optical system and moves synchronously with the outer turret without physical contact to the outer turret. The inner turret has a platform for mounting sensitive instrumentation. The platform is vibration-isolated such that direct transmission of aerodynamically-induced vibration from the outer turret is minimized or prevented. Unfortunately, the turret-in-turret approach requires duel-nested deployment mechanisms with isolated load paths to prevent the transmission of vibration to the instrumentation. Because of the duel-nested deployment mechanisms, the turret-in-turret approach is relatively complex and results in a configuration that is relatively high in weight, cost and volume, and requiring a high degree of maintenance.

As can be seen, there exists a need in the art for a vibration isolation assembly for an aerodynamic object such as a turret assembly of a beam director which minimizes the transmission of aerodynamically-induced vibration to sensitive optics and/or electronic components. Furthermore, there exists a need in the art for a vibration isolation assembly for an aerodynamic object which is simple in construction, light in weight and low in cost as a means for reducing or eliminating mechanical vibration.

BRIEF SUMMARY

The above-described needs associated with isolation of vibration in a system carried by an aerodynamic object are specifically addressed and alleviated by the various embodiments disclosed herein which comprise a vibration isolation assembly configured to attenuate aerodynamic loads inducing vibration into an aerodynamic object which may house a variety of different systems such as, without limitation, an electronics system and/or an optical system.

In one embodiment, the vibration isolation assembly may comprise a rigid outer layer disposed in spaced relation to an outer surface of the aerodynamic object and having a viscoelastic inner layer disposed between the rigid outer layer and the aerodynamic object. In this manner, the vibration isolation assembly provides an isolation and damping of vibration which may otherwise be transmitted to sensitive components such as the above-described electronics and optical systems and other instrumentation.

In one embodiment, the aerodynamic object may be configured as a turret assembly which may be disposed on a vehicle such as an aircraft. The turret assembly may be located on an underside of a fuselage of the aircraft. The turret assembly may comprise an inner gimbal subassembly rotationally mounted to an outer gimbal subassembly which, in turn, may be rotationally mounted to an optical system that may be contained within the aircraft. The outer gimbal subassembly may be configured to rotate laterally or in azimuth (e.g., in a horizontal plane) while the inner gimbal subassembly may be configured to rotate vertically or in elevation (e.g., in a vertical plane) such that the turret assembly provides a spherical range of motion to a system such as a pointing device. In this regard, the vibration isolation assembly provides a low-cost passive system for preventing or reducing the transmission of vibration induced by aerodynamic buffeting or loading on the aerodynamic object into sensitive electronics or optical systems contained within the aerodynamic object.

The technical effects of the disclosed embodiments include a reduction in the transmission of aerodynamically-induced vibration of the aerodynamic object without interfering with the functionality of the components that may be mounted within the aerodynamic object. The vibration isolation assembly provides a passive system which is simple in construction and low in cost. Furthermore, the vibration isolation assembly may be tuned in accordance with a natural frequency or resonant frequency (e.g., isolation frequency) of the system (e.g., mounting platform of optics and electronics) by material selection and/or sizing of inner and outer layers which make up the vibration isolation assembly.

In one embodiment, the outer layer may be configured as a continuous rigid layer mounted over a viscoelastic inner layer which, in turn, may be applied to the outer surface of the aerodynamic object. Alternatively, either one or both of the inner and outer layers may be configured as a plurality of segments which are applied to the aerodynamic object. The segments may define a plurality of gaps between adjacent segments to prevent lateral transmission of vibration.

In a further embodiment, the inner layer may be comprised of a plurality of discrete members which may be applied to the aerodynamic object such as the turret assembly in the present example wherein the discrete members are disposed in spaced relation to one another. The outer layer may be mountable to the discrete members such as by bonding thereto. The discrete members may be comprised of any suitable elastomeric or viscoelastic elements such as ring-shaped grommets which may be disposed in spaced relation to one another and to which the rigid outer layer may be bonded.

The outer layer may be comprised of a discontinuous configuration comprised of a plurality of segments. The outer layer is exposed to the atmospheric pressure fluctuations as a result of aerodynamic turbulence or buffeting which generates the aerodynamic loads. By configuring the outer layer as a plurality of segments, lateral transmission of the aerodynamic loading may be reduced or controlled in order to control the distribution of such pressure fluctuations into the inner layer.

In one embodiment, the pointing device may be configured as a beam director for a laser wherein a window mounted on the inner gimbal subassembly may be rotated into any position for projection of a laser beam through the window. In this regard, the vibration isolation assembly as disclosed herein may prevent the transmission of mechanical vibration from the outer layer to the beam director in order to prevent jittering of the beam which may reduce the time-averaged energy density applied to a target by the beam.

The inner and outer layers are preferably sized and configured to attenuate vibration occurring above a predetermined isolation frequency. For example, the inner and outer layers may be sized and configured to attenuate vibration of sensitive electronics at frequencies of greater than approximately 1.4 times the isolation frequency. In a preferable embodiment, the inner and outer layers are preferably sized and configured such that at frequencies of approximately 5 times the isolation frequency, the amount of vibration that is transmitted to the sensitive electronics may be reduced by approximately 50% and, in a more preferable embodiment, may be reduced by approximately 80%. Tailoring of the configuration of the outer layer and the viscoelastic inner layer permits the selection of the isolation frequency and may therefore provide a desired level of vibration isolation of the sensitive electronics and optics in a frequency range of highest sensitivity.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 1 is a perspective illustration of an aerodynamic object configured in one embodiment as a turret assembly mounted to an underside of an aircraft;

FIG. 2 is a plan view of the turret assembly taken along lines 2-2 of FIG. 1 and illustrating the turret assembly comprised of an inner gimbal subassembly mounted to an outer gimbal subassembly which, in turn, may be mounted to an optical assembly located inside the aircraft;

FIG. 3 is a side view of the turret assembly taken along lines 3-3 of FIG. 2 and illustrating a vibration isolation assembly disposed on the outer gimbal subassembly;

FIG. 4A is a sectional view of the vibration isolation assembly illustrating a continuous outer layer mounted to a continuous inner layer disposed on the outer gimbal subassembly;

FIG. 4B is a partial section view of the vibration isolation assembly illustrating the outer layer configured as a plurality of segments;

FIG. 5 is a side view of the turret assembly illustrating the vibration isolation assembly in an embodiment wherein the inner layer comprises a plurality of discrete elements;

FIG. 6 is a sectional view of the vibration isolation assembly illustrating the discrete elements disposed between the outer gimbal subassembly and the outer layer.

DETAILED DESCRIPTION

Figure 7:
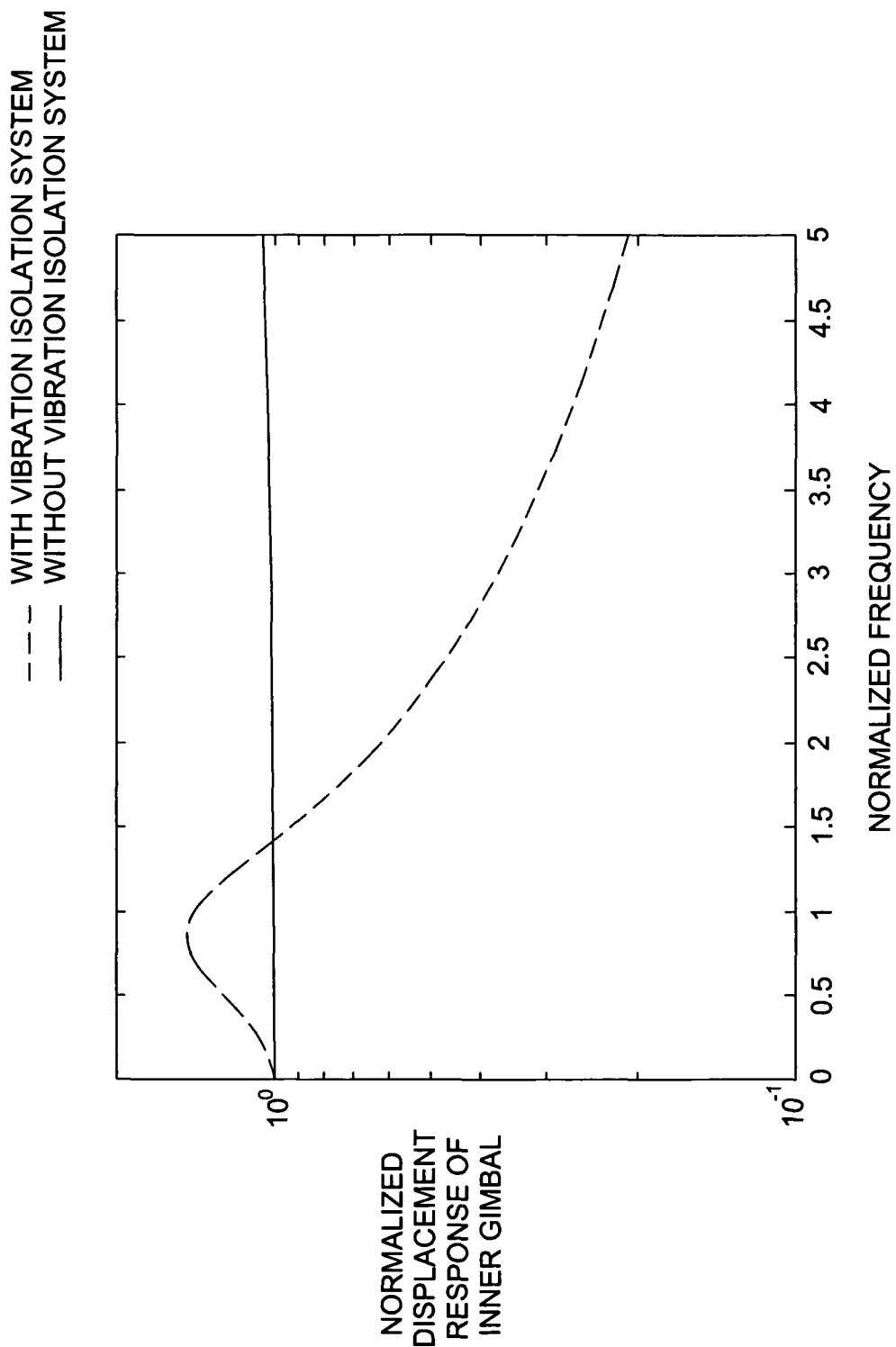
FIG. 7 is a graph illustrating a potential reduction in normalized displacement response of the inner gimbal subassembly as a function of normalized frequency due to the application of the vibration isolation assembly to an aerodynamic object.

Referring now to the drawings wherein the showings are for purposes of illustrating various embodiments of the disclosure only and not for purposes of limiting the same, shown in FIG. 1 is an aircraft 10 having an aerodynamic object 14 which is illustrated and described herein for exemplary purposes only as a turret assembly 16. The turret assembly 16 is shown mounted to a lower side of a fuselage 12 of the aircraft 10 although the turret assembly 16 or aerodynamic object 14 may be mounted at any location on any type of vehicle. Housed within the turret assembly 16 may be a variety of systems such as optical systems 32 and electronics systems 60 for a beam director 38 as may be used in a laser 36 system.

Advantageously, the turret assembly 16 may include a vibration isolation assembly 40 as disclosed herein for attenuating aerodynamic loads which may otherwise induce vibration of a system 30 that may be mounted within or which may form a part of the turret assembly 16. Unless attenuated, such vibration may be transmitted to the beam director 38 causing shaking or jittering of a beam or signal projected from the beam director 38. Such jittering may occur at characteristic frequencies at which the pressure fluctuations in the airflow impacting the turret assembly 16 during flight of the aircraft 10 are efficiently coupled into the structural elements of the turret assembly 16.

The vibration isolation assembly 40 comprises at least one and, more preferably, multiple layers that at least partially cover the turret assembly 16 and which are configured to attenuate or prevent vibration of the turret assembly 16. In one embodiment, the vibration isolation assembly 40 may comprise a rigid outer layer 44 which is preferably disposed in spaced relationship to a shell 18 of the aerodynamic object 14 (e.g., turret assembly 16). In this regard, the outer layer 44 defines a spacing 54 with the shell 18 of the aerodynamic object 14.

The vibration isolation assembly 40 may further comprise a viscoelastic inner layer 42 which is preferably disposed in the spacing 54 between the aerodynamic object 14 and the rigid outer layer 44 and is configured to attenuate vibration which otherwise would be transmitted to one or more systems 30 contained within or mounted to the turret assembly 16. Such systems 30 may include sensitive optical systems 32 and electronics systems 60.

It should be noted that although the aerodynamic object 14 is described herein as a beam director 38 housed within a turret assembly 16 and which may be mounted on an aircraft 10, the vibration isolation assembly 40 may be adaptable for a variety of different types of aerodynamic objects 14 and may be applied to a variety of different vehicles other than aircraft 10 and in a variety of different locations. For example, the vibration isolation assembly 40 may be applied to the turret assembly 16 which may be mounted on a nose portion of an aircraft.

In this regard, the vibration isolation assembly 40 may be applied to other types of aerodynamic objects 14 that are subjected to pressure fluctuations in airflow which may impact the surface of the aerodynamic object 14 and which may cause undesirable vibration of a system 30. The vibration isolation assembly 40 is specifically adapted to attenuate the transmission of vibration to systems within the aerodynamic object 14.

Ideally, the vibration isolation assembly 40 is configured to minimize the excitation of the system 30 at its natural frequency. In one embodiment, the vibration isolation assembly 40 is sized and configured to attenuate vibration of the system 30 at frequencies of greater than approximately 1.4 times the natural frequency or isolation frequency of the system. More specifically, the vibration isolation assembly 40 is preferably configured such that for vibration induced by aerodynamic loads (i.e., aerodynamic turbulence or buffeting), transmission of such vibration may be attenuated when the ratio of the aerodynamically-induced vibration of the aerodynamic object 14 over the isolation frequency is greater than approximately 1.4.

For frequency ratios (e.g., aerodynamically-induced vibration frequency/system isolation frequency) of less than 1.4, transmission of such aerodynamically-induced vibration may result in amplification of vibration in the system. However, such amplification may be effectively attenuated by active systems such as servo control loops or internal vibration isolators that are effective in reducing lower frequency vibration.

The effects of the vibration isolation assembly 40 can be graphically seen with brief reference to FIG. 7 which illustrates the potential reduction in the transmission of aerodynamically-induced vibration from the aerodynamic object 14 (e.g., turret assembly 16) to the system 30 (e.g., optical system 32, electronics system 60). More specifically, FIG. 7 graphically illustrates a potential reduction in normalized displacement response of the system 30 as a function of normalized frequency due to the application or integration of the vibration isolation assembly 40 to the aerodynamic object 14.

In one embodiment of the aerodynamic object 14, the turret assembly 16 may comprise an inner gimbal subassembly 26 mounted to an outer gimbal subassembly 22. Due to the application of the vibration isolation assembly 40 to the outer gimbal subassembly 22, the inner gimbal subassembly 26 experiences a reduction in normalized displacement response as a function of normalized frequency of the outer gimbal subassembly 22. As illustrated in FIG. 7, at approximately 5 times the isolation or resonant frequency of the system, the inner gimbal subassembly 26 may be subjected to less than approximately 20% of the vibration loading that would otherwise be imposed thereupon when the vibration isolation assembly 40 is omitted.

Referring to FIG. 1, at its location on the underside of the aircraft 10 fuselage 12, the turret assembly 16 may be subjected to significant aerodynamic turbulence due to interactions between the local air flow and the turret assembly 16 and/or aircraft 10. Such aerodynamic turbulence occurs as pressure fluctuations acting against the turret assembly 16 and which may be non-uniformly and/or non-synchronously applied. Such aerodynamic loading induces vibration which may be transmitted to systems housed within the turret assembly 16.

Referring to FIG. 2, shown is a plan view looking upwardly at the turret assembly 16. As was earlier indicated, the turret assembly 16 may be comprised of the inner gimbal subassembly 26 which may be mounted to the outer gimbal subassembly 22 which, in turn, may be mounted to the aircraft 10. The outer gimbal subassembly 22 is preferably configured to rotate in azimuth 24. The inner gimbal subassembly 26 is preferably configured to rotate in elevation 28. The azimuth 24 and elevation 28 rotations of the respective outer and inner gimbal subassemblies, 26, 22 facilitates a spherical range of motion for a beam which may be projected from a window 34 formed on the inner gimbal subassembly 26.

Referring to FIG. 3, shown is a side view of the turret assembly 16 illustrating the vibration isolation assembly 40 disposed on at least the outer gimbal subassembly 22. As can be seen, the inner gimbal subassembly 26 may include one or more windows 34. The inner gimbal subassembly 26 may include a main window 34 having a circular shape and through which a beam may be projected. Located adjacent to the main window 34 may be a plurality of smaller windows which facilitate target acquisition and directional pointing of the beam.

Various cameras, range finders, light sources and beam director 38 components such as electronics systems 60 and optical systems 32 may be housed within the inner gimbal subassembly 26. Advantageously, the vibration isolation assembly 40 prevents transmission of vibration from the outer surface 20 of the turret assembly 16 to the sensitive components such that the laser beam may be focused without jittering which would otherwise reduce the energy density of the beam that may be applied to the target.

Referring to FIGS. 4A and 4B, shown are partial cross-sectional views of the vibration isolation assembly 40 illustrating the rigid outer layer 44 disposed on the viscoelastic inner layer 42 which, in turn, is disposed on an outer surface 20 of a shell 18 of the outer gimbal subassembly 22. The outer layer 44 is preferably configured to distribute aerodynamic loads and, in this regard, is preferably fabricated of a rigid material such as a metallic material for distributing the pressure fluctuations induced by aerodynamic buffeting on the turret assembly 16. The outer layer 44 may be mounted to the inner layer 42 such as by using a suitable adhesive 56 or using mechanical attachment or alternative means.

The inner layer 42 is preferably fabricated of a resilient material such as viscoelastic material between the shell 18 of the turret assembly 16 and the outer layer. In this regard, the inner layer 42 prevents or reduces the transmission of structure-borne vibration from the outer layer 44 to the system 30 mounted to the inner gimbal subassembly 26. In the specific turret assembly 16 configuration illustrated in the figures, the vibration isolation assembly 40 may be limited to application of the inner and outer layers 42, 44 to the outer gimbal subassembly 22 with no treatment being applied to the inner gimbal subassembly 26 in view of the requirement for free rotation of the inner gimbal subassembly 26 in tight-fitting relation to the outer gimbal subassembly 22. More specifically, the inner gimbal subassembly 26 must be capable of rotating in elevational directions. The vibration isolation assembly 40 may also be omitted from the outer gimbal subassembly 22 in consideration of the laterally-facing orientation of the inner gimbal subassembly 26 which places the inner gimbal subassembly 26 in the wind-shadow of the outer gimbal subassembly 22 upon which the majority of aerodynamic loads may be imposed.

The inner layer 42 is preferably elastomeric or viscoelastic in nature due to the inherent damping capabilities provided thereby as a result of the elasticity (e.g., resiliency) of such viscoelastic materials. In one embodiment, the viscoelastic material may be comprised of a suitable polymeric material such as a polyurethane material. In a preferred embodiment, the polyurethane material is Sorbothane commercially available from Sorbothane, Inc. of Kent, Ohio. Due to its high energy-absorption capabilities, Sorbothane provides vibration absorption and attenuation characteristics as well as damping capabilities of structure-borne vibration.

Although the inner layer 42 is preferably comprised of an elastomeric or viscoelastic material, the inner layer 42 may be comprised of any material or combination of materials and is not limited to a single continuous layer of material. For example, the inner layer 42 may be comprised of alternative isolator configurations which may be disposed in spaced arrangement on the outer surface 20 on the outer gimbal subassembly 22. Furthermore, the inner layer 42 may be comprised of other metallic or non-metallic layer compositions configured to dissipate high-frequency energy that may be coupled into the shell 18 as a result of aerodynamic turbulence and pressure fluctuations.

Referring still to FIG. 4A, the outer layer 44 is preferably fabricated as a rigid layer such as a metallic material in order to facilitate the distribution of the aerodynamic loads imposed thereupon. However, the outer layer 44 may be fabricated of any suitable material capable of distributing aerodynamic loads onto the inner layer 42. For example, the outer layer 44 may be fabricated of a nonmetallic material such as fiberglass and/or graphite epoxy composite structures. In addition, the outer layer 44 may be fabricated of a combination of metallic and nonmetallic materials and may be tuned to provide a desired vibration attenuation characteristic in consideration of the resonant frequency or isolation frequency of the inner gimbal subassembly 26 or of the system 30 that is mounted to the inner gimbal subassembly 26. In this regard, the vibration isolation assembly 40 comprising the inner and outer layers 42, 44 is preferably configured to attenuate vibration within a predetermined frequency band.

The inner and outer layers 42, 44 are also preferably configured to prevent contact with the aircraft 10 during operation thereof such that movement of the inner and outer layers 42, 44 is not restricted. In this regard, the inner and outer layers 42, 44 are mounted to the outer gimbal subassembly 22 which, in turn, may be mounted to the aircraft 10 by a trunnion capable of rotating in azimuth 24 as was indicated above. The upper edges of the vibration isolation assembly 40 as illustrated in FIG. 3 are preferably disposed in gapped arrangement to the fuselage 12 to prevent contact therewith which may hinder rotation of the outer gimbal subassembly 22 and which may affect vibration attenuation capabilities.

Referring to FIG. 4B, shown is a partial sectional view of the vibration isolation assembly 40 illustrating the outer layer 44 provided as a plurality of segments 46 each defining a gap 48 between an adjacent segment 46. The segments 46 are each exposed to the aerodynamically-induced pressure fluctuations. By forming the outer layer 44 as a plurality of segments 46 instead of as a continuous structure that extends around the turret assembly 16, transmission of vibration in a lateral direction is minimized. It is generally preferred that the segments 46 comprise a nearly total covering of the inner layer 42 so that the pressure fluctuations induced by the aerodynamics of the turret assembly 16 may, to the largest extent practical, be coupled into the segments 46 rather than to the inner layer 42 of the turret assembly 16.

Although FIG. 4B illustrates the outer layer 44 as being disposed of segments 46, the inner layer 42 may also be provided as a plurality of segments 46 instead of the continuous configuration shown. In addition, both the inner and outer layers 42, 44 may be configured as a plurality of discontinuous segments 46 which may be applied to the turret assembly 16 or other aerodynamic object 14 in any pattern such as a uniformly-spaced pattern or in a non-uniform pattern depending upon the distribution of the pressure fluctuations and the desired attenuation characteristics of the vibration isolation assembly 40.

Referring to FIG. 5, shown is a side view of the turret assembly 16 illustrating the vibration isolation assembly 40 in an alternative embodiment as applied to the outer gimbal subassembly 22 of the aerodynamic object 14 (e.g., turret assembly 16). In FIG. 5, the vibration isolation assembly 40 comprises the outer layer 44 which is shown as a continuous layer which may be applied to the outer gimbal subassembly 22. The inner layer 42 may be comprised of a plurality of discrete members 50 which are applied to the outer surface 20 of the shell 18 of the turret assembly 16.

The discrete members 50 can be seen as being comprised of a plurality of elastomeric elements 52 which may be ring-shaped. However, the discrete members 50 may take alternative shapes other than the ring shape shown in FIG. 5. For example, the elastomeric elements 52 may be formed in a shape which maximizes vibration attenuation and dampening of the vibrations of a particular frequency and amplitude. Alternatively, such elastomeric elements 52 may be shaped in a manner that facilitates the attachment of the inner and outer layers 42, 44 to the outer gimbal subassembly 22. In one embodiment, the elastomeric elements 52 may be formed as square-shaped pads disposed in spaced relationship to one another. The ability to configure the inner layer 42 as the plurality of elastomeric elements 52 facilitates the tailoring of the vibration attenuation characteristics to the aerodynamically-induced vibrations.

FIG. 6 illustrates a partial cross-sectional view of the vibration isolation assembly 40 comprised of the plurality of elastomeric elements 52 which, in the configuration shown, are provided as ring-shaped members which may be disposed between the rigid outer layer 44 and the outer surface 20 of the outer gimbal subassembly 22. The elastomeric elements 52 may be mounted to the outer surface 20 of the outer gimbal subassembly 22 by any means such as by using a suitable adhesive 56 or by using double-faced tape 58 such as an epoxy tape. Likewise, the outer layer 44 may be attached to the elastomeric elements 52 by a suitable adhesive 56.

Advantageously, the attenuation characteristics of the elastomeric elements 52 may be tailored to provide a desired frequency response due to the ability to select the material composition and the ability to tailor the size and configuration of the elastomeric elements 52 which may be molded into any shape. The vibration attenuation characteristics of the elastomeric elements 52 may also be tailored by altering the spacings between the elastomeric elements 52.

Referring briefly to FIG. 7, shown is the graph illustrating the potential reduction in normalized displacement response of the inner gimbal subassembly 26 as a function of normalized frequency. The reduction in displacement (i.e., vibration) of the inner gimbal subassembly 26 as the result of the vibration isolation assembly 40 is preferably such that at frequencies of greater than 1.4 times the isolation frequency of the system 30 (e.g., electronics system 60, optical system 32) mounted within the inner gimbal subassembly 26, the vibration of the system 30 is reduced compared to the non-attenuated vibration of the system.

The inner and outer layers 42, 44 of the vibration isolation assembly 40 are preferably sized and configured such that at frequencies of approximately 5 times the isolation frequency, the amount of vibration that may be transmitted to the systems is reduced by approximately 50%. Most preferably, the vibration isolation assembly 40 is configured such that the amount of vibration transmitted to the system 30 may be reduced by approximately 80%.

In use, the vibration isolation assembly 40 provides a means for reducing the transmission of the vibration induced in a system 30 that may be contained within the aerodynamic object 14 (e.g., turret assembly 16) as a result of the application of aerodynamic loads imposed thereupon. In a method for reducing the transmission of vibration, the method may comprise the steps of applying the viscoelastic or elastomeric inner layer 42 to the aerodynamic object 14, and applying a rigid outer layer 44 to the inner layer 42 in order to distribute aerodynamic loads imposed on the outer gimbal subassembly 22. The vibration isolation assembly 40 is preferably configured to attenuate the transmission of aerodynamically-induced vibration from the outer layer 44 to the system 30 which may be contained with the aerodynamic object 14.

As was indicated above, the inner layer 42 is preferably comprised of viscoelastic material which may be provided as a continuous layer or which may be provided as a plurality of discrete members 50 or segments 46 which may be applied to the aerodynamic object 14 and which may be disposed in spaced relation to one another. The outer layer 44 is preferably mounted on or supported by the inner layer 42 and may be bonded to the inner layer 42 using adhesive 56 and or using a suitable mechanical attachment. Where mechanical attachments are used, such mechanical attachments are preferably configured in an arrangement that will avoid the formation of a continuous path for conduction of vibration from the outer layer 44 to the aerodynamic object 14.

The outer layer 44 is preferably configured as a relatively rigid layer which may be at least partially fabricated of metallic material configured to distribute atmospheric pressure fluctuations (e.g., aerodynamic loading such as turbulence or buffeting). The outer layer 44 may be provided as a discontinuous member comprised of a plurality of segments 46 each defining a gap 48 therebetween in order to limit the lateral transmission or distribution of pressure fluctuations to other portions of the outer layer 44. Likewise, the inner layer 42 may be comprised of a plurality of segments 46 each defining a gap 48 therebetween.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A vibration isolation assembly for attenuating vibration of an aerodynamic object, the vibration isolation assembly comprising:
   a viscoelastic inner layer comprised of a plurality of elastomeric segments mounted to a majority of a circumference of an outer surface of a continuous shell of the aerodynamic object, at least one of the segments having space or gaps surrounding the segment relative to the adjacent segments, the segments being in direct contact with the shell of the aerodynamic object and being configured to attenuate the vibration to the aerodynamic object;
   a one-piece rigid outer layer comprising a continuous solid shell configured as a unitary structure having a closed cross-section extending around a circumference of the aerodynamic object and subjected to aerodynamically-induced pressure fluctuation;
   the continuous solid shell of the rigid outer layer being mounted to and covering a substantial entirety of the plurality of elastomeric segments of the viscoelastic inner layer; and
   the plurality of segments of the viscoelastic inner layer being configured to minimize transmission of vibration in a lateral direction and prevent the coupling of aerodynamically-induced pressure fluctuations into a system contained within the aerodynamic object.

2. The vibration isolation assembly of claim 1 wherein:
   the inner and outer layers cooperating to attenuate the transmission of vibration to the system.

3. The vibration isolation assembly of claim 1 wherein:
   aerodynamic loads induce vibration in the system; and
   the outer layer being configured to distribute the aerodynamic loads.

4. The vibration isolation assembly of claim 1 wherein:
   the viscoelastic material is comprised of polymeric material.

5. The vibration isolation assembly of claim 4 wherein:
   the polymeric material is a polyurethane material.

6. The vibration isolation assembly of claim 1 wherein:
   the aerodynamic body is a turret assembly disposed on an aircraft;
   the turret assembly including:
   an outer gimbal subassembly being mountable to the aircraft and being operative to rotate in azimuth; and
   an inner gimbal subassembly housing the system and being mountable to the outer gimbal subassembly and being operative to rotate in elevation;
   the inner and outer layers being sized and configured to attenuate vibration of the turret assembly occurring above a predetermined isolation frequency thereof.

7. The vibration isolation assembly of claim 6 wherein:
the inner and outer layers are sized and configured to attenuate vibration of the system at frequencies of greater than approximately 1.4 times the isolation frequency.

8. The vibration isolation assembly of claim 6 wherein:
the inner and outer layers are sized and configured such that at frequencies of approximately 5 times the isolation frequency, the amount of vibration transmitted to the system is reduced by at least approximately 50 percent.

9. An aircraft, comprising:
a vibration isolation assembly for attenuating vibration of an aerodynamic object housing a system, the vibration isolation assembly comprising:
a viscoelastic inner layer comprised of a plurality of elastomeric segments mounted to a majority of a circumference of an outer surface of a continuous shell of the aerodynamic object, at least one of the segments having space or gaps surrounding the segment relative to the adjacent segments, the segments being in direct contact with the shell of the aerodynamic object and being configured to attenuate the vibration to the aerodynamic object;
a one-piece rigid outer layer comprising a continuous solid shell configured as a unitary structure having a closed cross-section extending around a circumference of the aerodynamic object and subjected to aerodynamically-induced pressure fluctuations;
the continuous solid shell of the rigid outer layer being mounted to and covering a substantial entirety of the plurality of elastomeric segments of the viscoelastic inner layer; and
the plurality of segments of the viscoelastic inner layer being configured to minimize transmission of vibration in a lateral direction and prevent the coupling of aerodynamically-induced pressure fluctuations into a system contained within the aerodynamic object.

10. The aircraft of claim 9 wherein:
aerodynamic loads induce vibration in the system; and
the outer layer being configured to distribute the aerodynamic loads.

11. The aircraft of claim 9 wherein:
the aerodynamic body is a turret assembly disposed on the aircraft;
the turret assembly including:
an outer gimbal subassembly being mountable to the aircraft and being operative to rotate in azimuth; and
an inner gimbal subassembly housing the system and being mountable to the outer gimbal subassembly and being operative to rotate in elevation;
wherein the inner and outer layers are sized and configured to attenuate vibration of the system occurring above a predetermined isolation frequency thereof.

12. A method of reducing the transmission of vibration induced in a system contained within an aerodynamic object from aerodynamic loads imposed thereon, a viscoelastic inner layer comprised of a plurality of elastomeric segments mounted to a majority of a circumference of an outer surface of a continuous shell of the aerodynamic object, at least one of the segments having space or gaps surrounding the segment relative to the adjacent segments, a one-piece rigid outer layer comprising a continuous solid shell configured as a unitary structure having a closed cross-section extending around a circumference of the aerodynamic object and mounted to and covering a substantial entirety of the plurality of elastomeric segments of the viscoelastic inner layer, the method comprising the steps of:
subjecting the continuous solid shell of the rigid outer layer to aerodynamically-induced pressure fluctuations;
using the gaps between the elastomeric segments of the inner layer to minimize the transmission of vibration in a lateral direction; and
preventing, using the segments, the coupling of the aerodynamically-induced pressure fluctuations from the outer layer to a system contained within the aerodynamic object.

* * * * *